US012708123B2

(12) United States Patent
Catalano et al.

(10) Patent No.: US 12,708,123 B2
(45) Date of Patent: Aug. 18, 2026

(54) APPARATUS AND METHOD FOR DOSING AND FEEDING A FLUID OR PASTY MIXTURE INTO MOULDS, IN PARTICULAR A CHOCOLATE-BASED MIXTURE

(71) Applicant: SOREMARTEC S.A, Senningerberg (LU)

(72) Inventors: Giorgio Catalano, Neustadt/Hessen (DE); Winfried Stork, Amöneburg (DE)

(73) Assignee: SOREMARTEC S.A., Senningerberg (LU)

( * ) Notice: Subject to any disclaimer, the term of this patent is extended or adjusted under 35 U.S.C. 154(b) by 667 days.

(21) Appl. No.: 18/010,408

(22) PCT Filed: Jun. 18, 2021

(86) PCT No.: PCT/IB2021/055401
§ 371 (c)(1),
(2) Date: Dec. 14, 2022

(87) PCT Pub. No.: WO2021/255703
PCT Pub. Date: Dec. 23, 2021

(65) Prior Publication Data

US 2023/0276821 A1 Sep. 7, 2023

(30) Foreign Application Priority Data

Jun. 19, 2020 (IT) ........................ 102020000014797

(51) Int. Cl.
*A23G 1/00* (2025.01)
*A23G 1/20* (2006.01)
(Continued)

(52) U.S. Cl.
CPC ........... *A23G 1/0066* (2013.01); *A23G 1/206* (2013.01); *A23G 3/0072* (2013.01); *A23G 3/0257* (2013.01)

(58) Field of Classification Search
CPC .... A23G 1/0066; A23G 1/206; A23G 3/0072; A23G 3/0257
See application file for complete search history.

(56) References Cited

U.S. PATENT DOCUMENTS 2,917,272 A 12/1959 Kollman et al.
9,380,790 B2 * 7/2016 Van Gerwen ........... A23L 13/00
(Continued)

FOREIGN PATENT DOCUMENTS

CN 0210299340 U 4/2020
FR 384797 A 4/1908
(Continued)

OTHER PUBLICATIONS

International Search Report and Written Opinion in corresponding International Application No. PCT/IB2021/055401, dated Nov. 11, 2021, 13 pages.
(Continued)

*Primary Examiner* — Donnell A Long
(74) *Attorney, Agent, or Firm* — FisherBroyles, LLP; Robert Kinberg

(57) ABSTRACT

A fluid mixture, for example, a chocolate-based mixture, is dosed and fed to forming moulds through two cavities arranged on diametrically opposite sides of a longitudinal axis and having respective opposite inlets. The cavities are rotated in unison and in a stepwise manner around a longitudinal axis between an inlet opening for the mixture and an outlet opening for the mixture and dosed while keeping the volume of both cavities unchanged. One of the cavities is filled with a predefined quantity of fluid mixture and the
(Continued)

other cavity is simultaneously emptied while keeping the cavities in angularly fixed positions around the longitudinal axis.

13 Claims, 6 Drawing Sheets

(51) Int. Cl.
*A23G 3/02* (2006.01)
*A23G 3/34* (2006.01)

(56) References Cited

U.S. PATENT DOCUMENTS

| | | | | |
|---|---|---|---|---|
| 2006/0051475 | A1 * | 3/2006 | Fornaguera .......... | A23G 3/0257 426/516 |
| 2010/0132394 | A1 * | 6/2010 | Hansen .................. | A23G 9/221 62/340 |

FOREIGN PATENT DOCUMENTS

| | | | |
|---|---|---|---|
| RU | 2013964 | C1 | 6/1994 |
| RU | 2269899 | C2 | 2/2006 |
| RU | 2608679 | C2 | 1/2017 |
| RU | 2688412 | C2 | 5/2019 |
| RU | 198110 | U1 | 6/2020 |
| WO | 1991018518 | A1 | 12/1991 |
| WO | WO 9118518 | A1 * | 12/1991 |
| WO | 2015193928 | A1 | 12/2015 |

OTHER PUBLICATIONS

Russian Search Report of Russian Application No. 2022132512/10(070886), mailed Sep. 27, 2024, 2 pages.

Russian Official Action for Russian Application No. 2022132512/10(070886), mailed Sep. 30, 2024, 7 pages.

* cited by examiner 3
5
6
8
25
30B
19
39
37
40
45
2B
15
12
D
L1
29
13
46
30A
L2
42
P
41
21
20
31
18
16
30B
2A
45
46
29
38
40
39
7
10
24

APPARATUS AND METHOD FOR DOSING AND FEEDING A FLUID OR PASTY MIXTURE INTO MOULDS, IN PARTICULAR A CHOCOLATE-BASED MIXTURE

CROSS-REFERENCE TO RELATED APPLICATIONS

This patent application is a U.S. National Stage of PCT Application No. PCT/IB2021/055401filed Jun. 18, 2021 which claims priority from Italian patent application No. 102020000014797 filed on Jun. 19, 2020, the entire disclosure of which is incorporated herein by reference.

TECHNICAL FIELD

The present invention relates to a apparatus and method for dosing and feeding a fluid or pasty mixture into moulds, in particular a chocolate-based mixture, to which the following discussion will make explicit reference without thereby losing generality.

STATE OF THE PRIOR ART

For the dosing and feeding of fluid mixtures into forming moulds, it is known, for example from patent application WO 2015/193928 A1, to use a feeding device having a cylindrical chamber, in which the mixture to be fed is introduced by means of a hopper, and from which a quantity of mixture outflows towards the underlying forming mould through two parallel and separate outlets.

Inside the cylindrical chamber, the feeding device comprises a valve body or shutter which can move with alternating cyclic motion to open/close one or the other of said outlets.

Again, inside the chamber, the device further comprises a pusher blade, which is also rotated with alternating cyclic motion around a fixed axis and in a synchronized manner with the valve body. The blade has a perimeter edge which slides in contact with the internal surface of the chamber to move a mass of mixture, firstly towards the outlet which will be opened, and then through the same outlet when it will be open.

During the aforementioned moving and pushing steps, a further mass of mixture enters the chamber, and the same mass is moved and pushed towards the other outlet by reversing the direction of rotation of both the valve body and the blade.

The feeding device defined above, by transferring flows first to one and then to the other of the two outlets provided, suffers from the main drawback of being an intermittent or discontinuous feeding device. This discontinuity generates product waiting times which do not allow the productivity, i.e., the speed of movement of the moulds below the outlets, to be increased.

In addition to this, the reduced contact surface of the perimeter edge of the blade with the internal surface of the chamber, as well as the possible deformation of the blade under load, on the one hand, lead to inevitable wear of the blade, and generally of the components in relative motion, with metal parts inevitably ending up in the fluid mixture, and, on the other hand, to progressive loss of tightness with leakage which, as it increases, generates errors in the dosing of the fed product.

For the reasons set out above, the known device of the type defined above requires periodic checks and adequate maintenance by specialized personnel precisely to avoid dosing problems, but above all to prevent contamination of the treated mixture and products made therewith.

Dosing apparatus for feeding a fluid mixture into moulds of other than those mentioned above are described, for example, in WO 91/18518 A1 and in FR 384 797 A.

OBJECT OF THE INVENTION

The purpose of the present invention is to provide a dosing apparatus for feeding a fluid or pasty mixture into moulds, which allows the problems described above to be solved in a simple and inexpensive way, and in particular allows the fluid mixture to be fed in a continuous manner.

A further purpose of the present invention is to provide a dosing apparatus which can be configured in a simple and fast manner with each change in production, i.e., with each change of mixture to be fed into the moulds and with each change of moulds.

A further purpose of the present invention is to provide a dosing apparatus which can simultaneously feed at least one pair of parallel rows of forming moulds in a continuous and balanced manner at all times.

According to the present invention, a apparatus for dosing and feeding a fluid or pasty mixture into moulds, in particular a chocolate-based mixture, as claimed in claim 1, is provided.

The present invention also relates to a method for dosing and feeding a fluid mixture into moulds, in particular a chocolate-based mixture.

According to the present invention, a method for dosing and feeding a fluid mixture into moulds, in particular a chocolate-based mixture, as claimed in claim 10, is provided.

BRIEF DESCRIPTION OF THE DRAWINGS

The invention will now be described with reference to the accompanying drawings, which illustrate a non-limiting embodiment thereof, in which.

PREFERRED EMBODIMENT OF THE INVENTION

Figure 1:
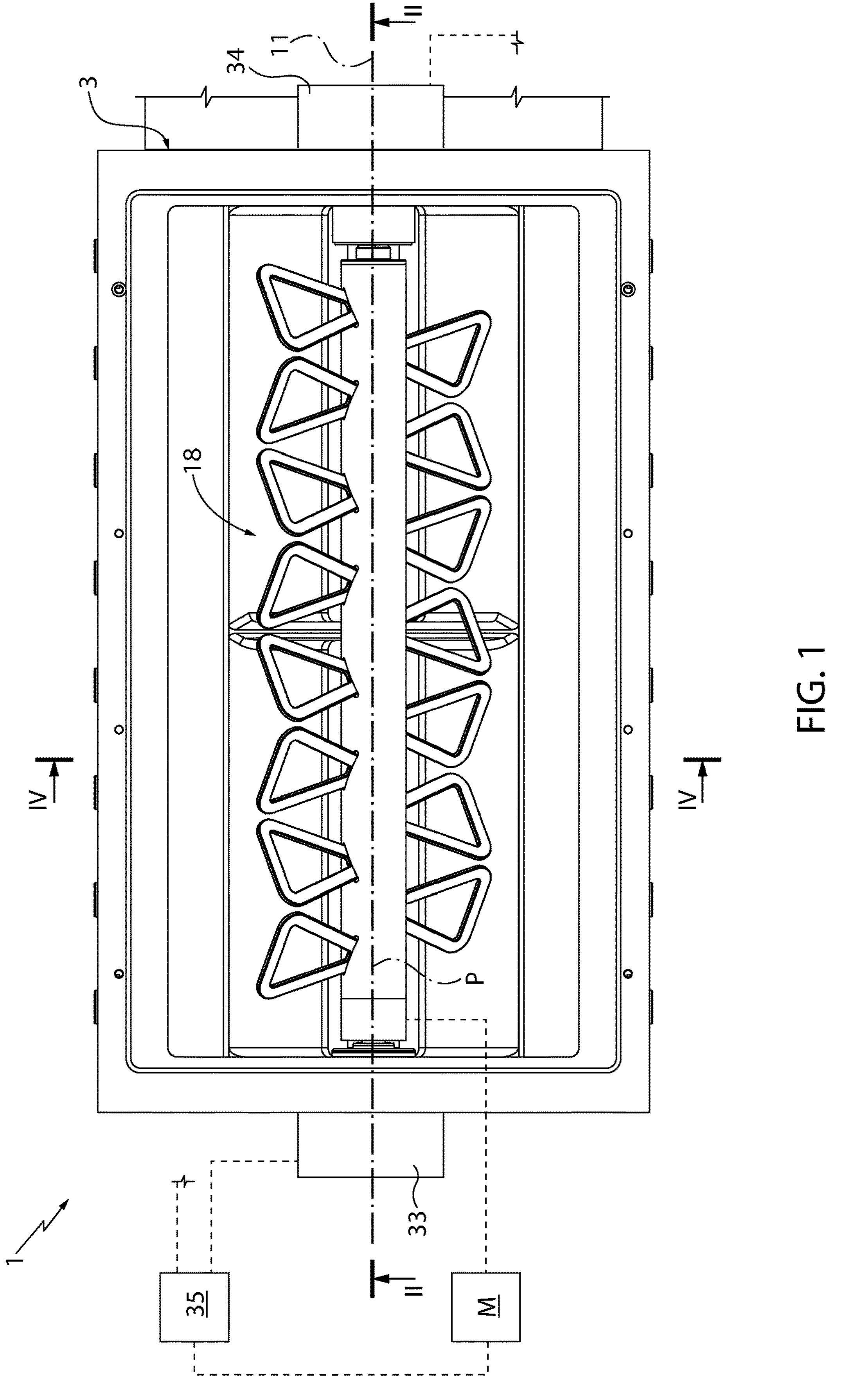
FIG. 1 is a plan view of a pouring machine provided with a pouring apparatus for dosing a fluid mixture into moulds, made according to the teachings of the present invention.
Figure 2:
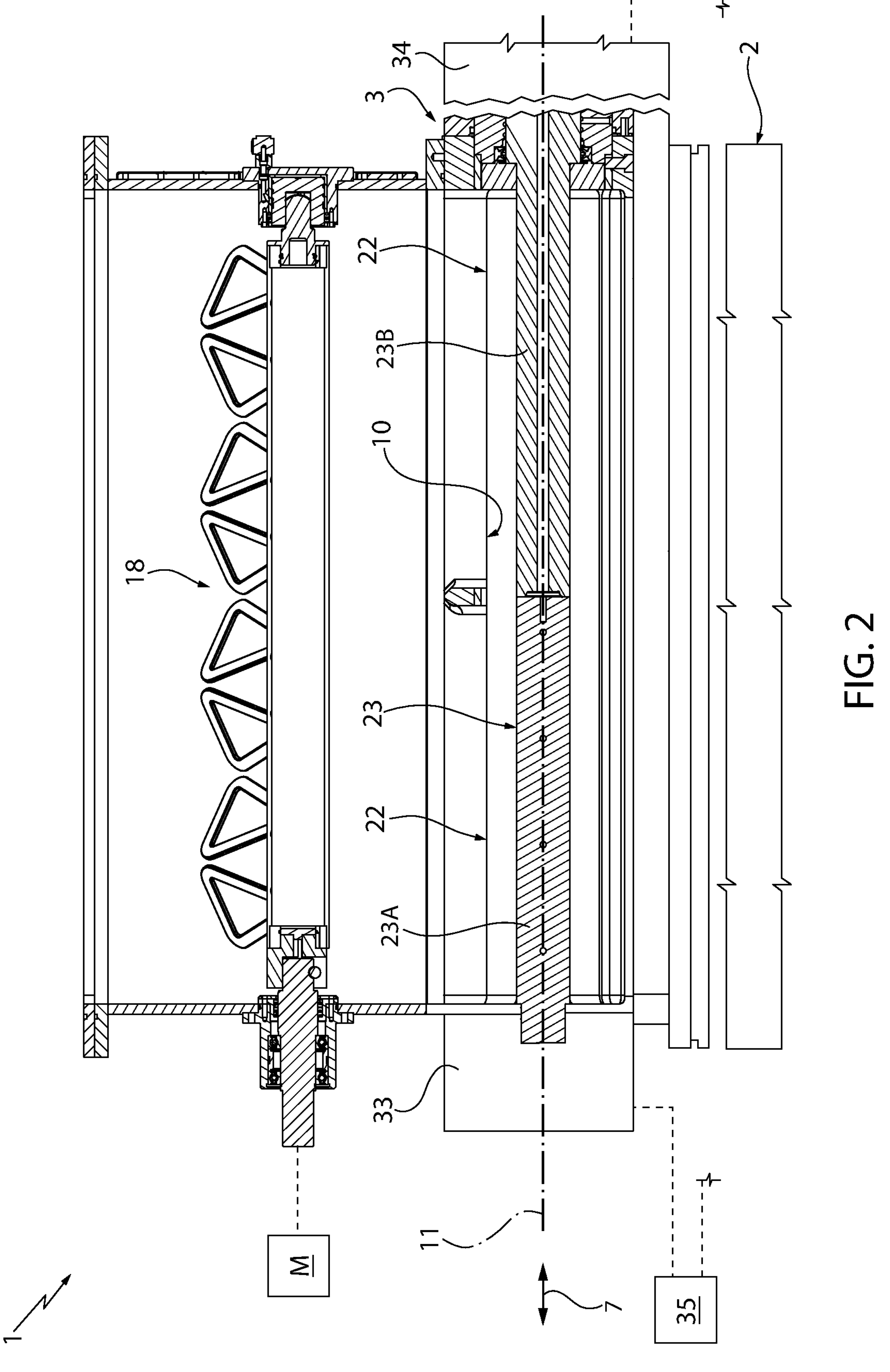
FIG. 2 is a cross-section along the line II-II in FIG. 1.
Figure 7:
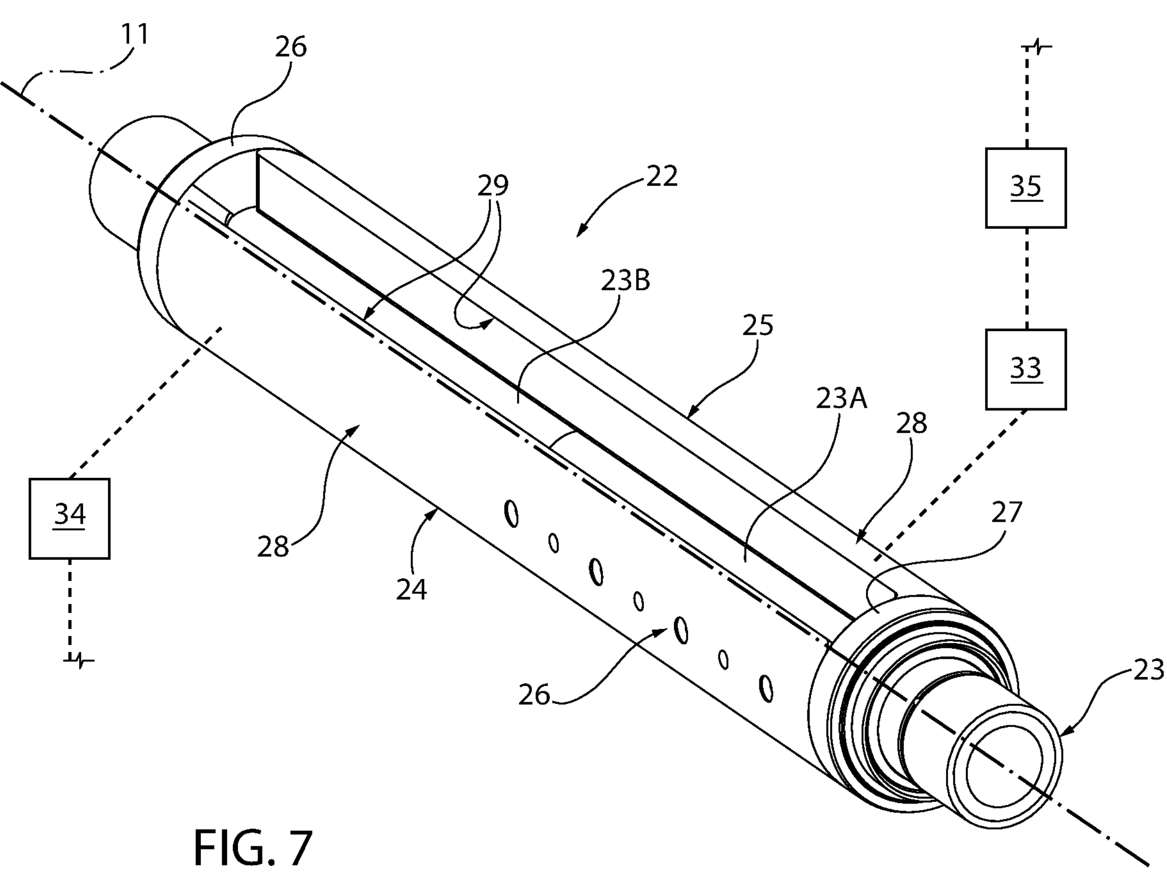
FIG. 7 is a perspective view, on an enlarged scale, of a detail in FIGS. 3, 4, and 5.

In FIGS. 1 and 2, the numeral 1 indicates, as a whole, a pouring machine for dosing and feeding a fluid or pasty or creamy mixture into compartments of underlying forming moulds 2, known per se and not described in detail (FIGS. 2 and 7).

Here and hereinafter, the term "fluid or pasty or creamy mixture" refers to any mixture, with or without inclusions, having characteristics such that it can be dosed, poured, and treated inside forming moulds, and conveniently a chocolate-based confectionery mixture, with or without inclusions, such as, for example, chopped hazelnuts, meringues, biscuits, etc.

The machine 1 comprises an overhead frame 3 and an apparatus 4 for continuously dosing and feeding the fluid mixture to the moulds 2.

Conveniently, but not necessarily, the apparatus 4 is suspended from the frame 3 (FIG. 4) and is provided with wheels 5 rotating on respective guides 6 fixed to the frame 3 to translate in opposite ways in one direction 7.

Regardless of how it is supported, the apparatus 4 comprises a block 8 that may or may not be heated (FIGS. 3-6) having a cylindrical chamber 10 extending coaxially with an axis 11 parallel to the direction 7 and having a longitudinal upper opening 12 and a longitudinal lower opening 13 diametrically opposite each other with respect to the axis 11 and symmetrical with respect to a vertical centre plane P (FIG. 4) on which the axis 11 lies, the outline of which is shown in FIGS. 1, 3, 4, 5, 6, and 8.

Figure 4:
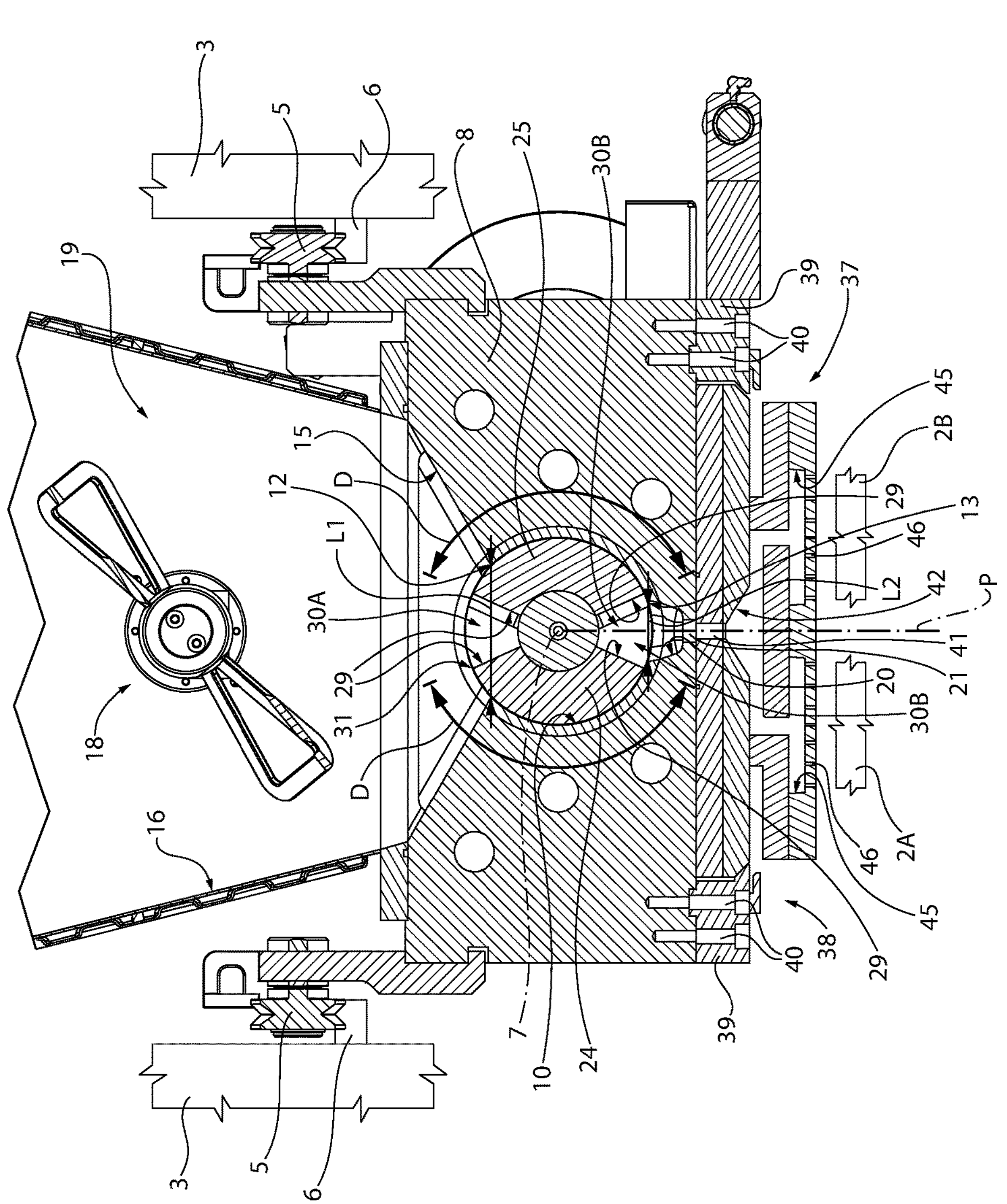
FIG. 4 is a cross-section along the line IV-IV in FIG. 1.

With reference to FIG. 4, the upper opening 12 has a dimension L1 measured orthogonally to the plane P which is greater than the dimension L2 of the lower opening 13 measured in the same direction. According to a variant, not shown, the dimension L2 is approximately equal to the dimension L1.

The upper opening 12 is formed on the bottom of a lower hopper 15 for conveying the fluid mixture towards the same upper opening 12.

The lower hopper 15, in turn, has an inlet communicating with the outlet of an upper hopper 16, which rises upwards from the lower hopper 15 and houses a motorized mixer member 18, known per se and not described in detail, driven by a motor M. The hoppers 15 and 16 therefore define a compartment 19 which, in use, houses the fluid mixture to be dosed and fed.

The lower opening 13, on the other hand, is the inlet of an underlying storage and transit chamber 20, which is formed inside the block 8, extends parallel to the axis 11, and is tapered downwards.

The chamber 20 has a bottom wall, through which the inlets of a row of feed passages 21 are formed, which are adjacent to each other and conveniently, but not necessarily, cylindrical with centres lying on the vertical plane P and respective axes orthogonal to the axis 11 and lying on the plane P. The passages 21 are formed in a lower end portion of the block 8.

Figure 3:
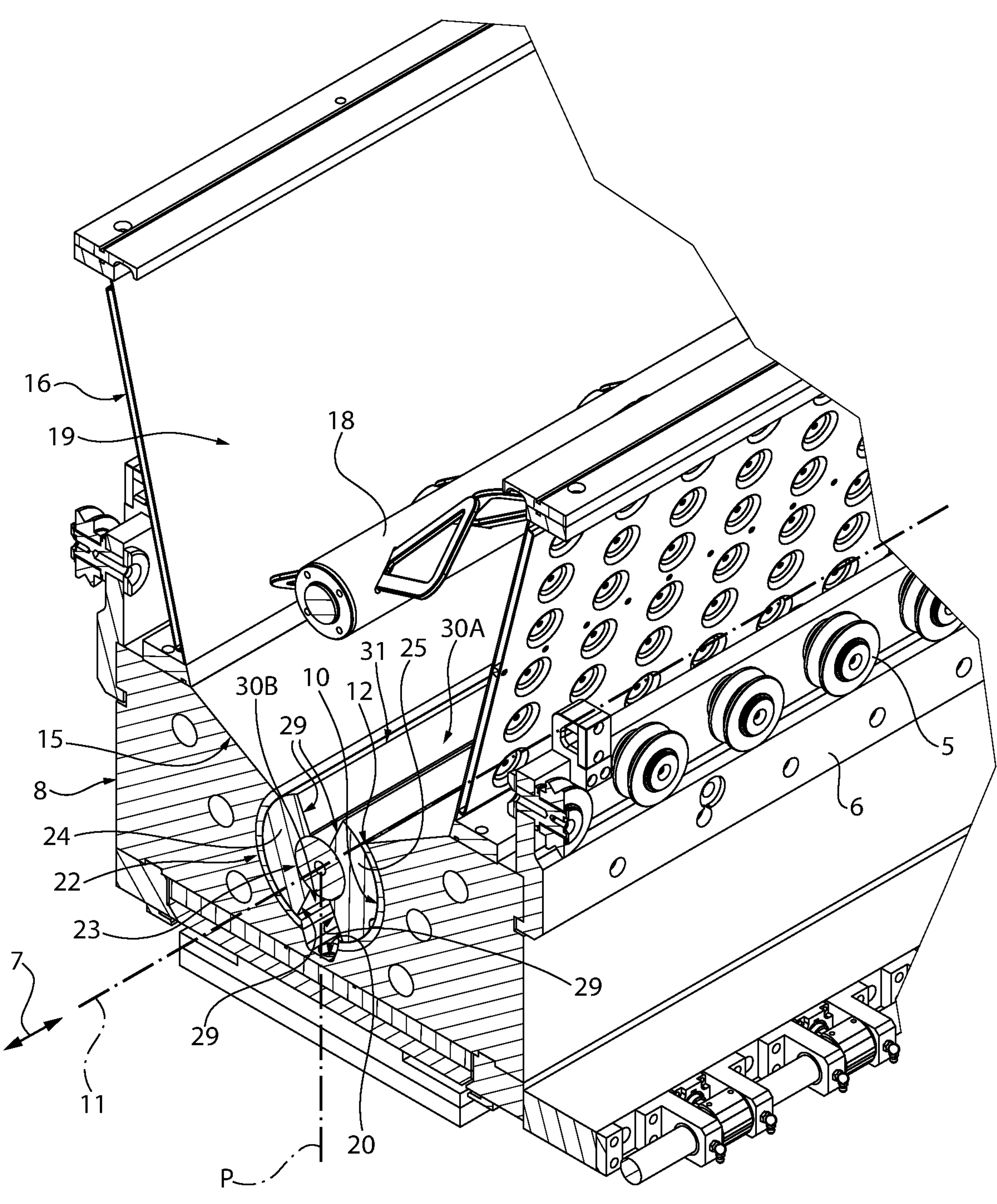
FIG. 3 is a perspective view, with parts removed for clarity, of the machine in FIG. 1.

Again, with reference to FIGS. 3 and 4 and, in particular, to FIG. 7, the apparatus 4 further comprises a rotating assembly 22 for dosing and feeding the mixture towards the chamber 20 and the passages 21. The rotating assembly 22 is housed in the chamber 10 coaxially with the axis 11 and partially protrudes into the lower hopper 15 through the upper opening 12.

Again, with reference to FIGS. 3 and 4, the rotating assembly 22 comprises an elongated core or central cylindrical support shaft 23, which extends coaxially with the axis 11 and has opposite end portions protruding outside the chamber 10 and coupled to the block 10 in a rotatable manner and in an axially fixed position, and in a known manner.

The rotating assembly 22 also comprises two longitudinal cylindrical sectors 24 and 25, which are arranged outside and in contact with the central shaft 23 and are coupled to the shaft 23 in an axially fixed position, and in a rotatable and fluid-tight manner. Here and hereinafter, fluid-tight coupling refers to a coupling capable of preventing any leakage of the fluid mixture between the parts relative to each other, whatever the mixture is.

With reference to FIG. 7, the cylindrical sectors 24, 25 have respective opposite end portions, which are coupled to respective collars 26 and 27 in a fluid-tight manner.

The collars 26 and 27 are fixed, in a known way, to the block 8 and are coupled to the shaft 23 in a fluid-tight manner.

Each cylindrical sector 24, 25 consists of a single piece and is equal in geometry, size, and weight to the other cylindrical sector. In this way, the rotating assembly 22 is perfectly balanced.

The cylindrical sectors 24,25 are delimited externally by respective cylindrical perimeter surfaces 28 coupled to the internal surface which delimits the chamber 10 in a rotatable and fluid-tight manner, and laterally by two respective flat radial surfaces 29 orthogonal to the axis 11. The radial surfaces 29 of the same cylindrical sector 24, 25 converge towards each other and towards the axis 11, thereby forming a dihedral angle D (FIG. 4) ranging from 115 to 170 degrees. Preferably, each dihedral angle is substantially 135°.

Again, with reference to FIGS. 3 and 4, the shaft 23, the opposite radial surfaces 29 of the cylindrical sectors 24, 25, and the collars 26, 27 define two variable volume cavities 30A and 30B arranged in diametrically opposite positions with respect to the axis 11 and having respective opposite inlets/outlets 31 facing outwards, as can be seen in FIGS. 3 and 4.

The two cylindrical sectors 24,25 are rotated independently of each other and in opposite directions around the axis 11 by respective independent motorized actuator devices 33 and 34, known per se and not described in detail, schematically shown in FIG. 7.

The devices 33 and 34 are commanded and controlled by a command-and-control unit 35, which commands the rotation of the cylindrical sectors 24, 25 with respect to each other and around the axis 11 so as to initially set the volume of the cavities 30A, 30B and to transfer the fluid mass contained in each of the cavities 30A, 30B towards the moulds 2, as will be better defined below.

With reference to FIGS. 2 and 3, the motorized actuator devices 33 and 34 are arranged on opposite sides of the assembly 22, and the central shaft 23 consists of two segments or portions 23A and 23B, which are aligned with one another along the axis 11, have identical external diameters and are stably connected, one to the cylindrical sector 24 and the other to the cylindrical sector 25, by means of pins or threaded grub screws or other equivalent fastening devices, generally indicated by 26 in FIG. 7.

According to a variant, not shown, the shaft 23 is replaced by a shaft with coaxial portions so that the actuator devices 33 and 34 can be arranged on the same side of the assembly 22.

Regardless of their arrangement, the actuator devices 33 and 34 are always commanded and controlled by the unit 35.

Again, with reference to FIGS. 4 to 6, below the block 8, the apparatus 4 comprises a pouring plate 37 for pouring or distributing the fluid mixture into the moulds 2.

Figure 5:
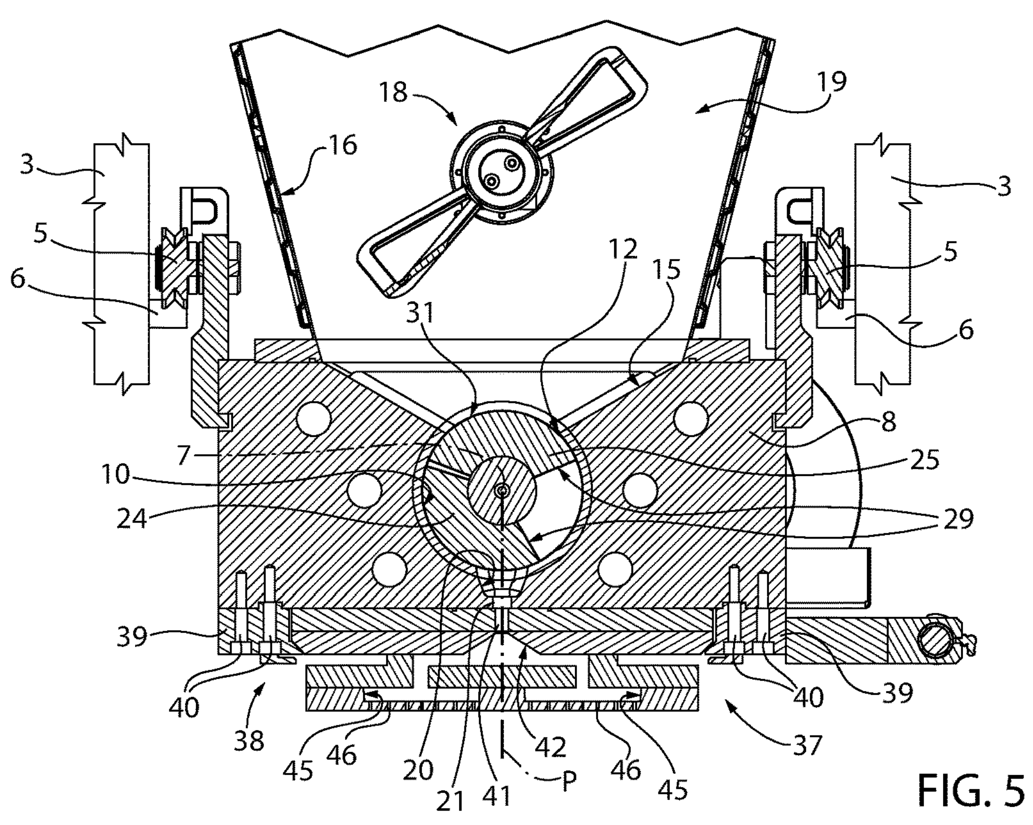
FIGS. 5 and 6 are figures similar to FIG. 4 showing, on a reduced scale, the machine in FIG. 4 under different operating conditions.
Figure 6:
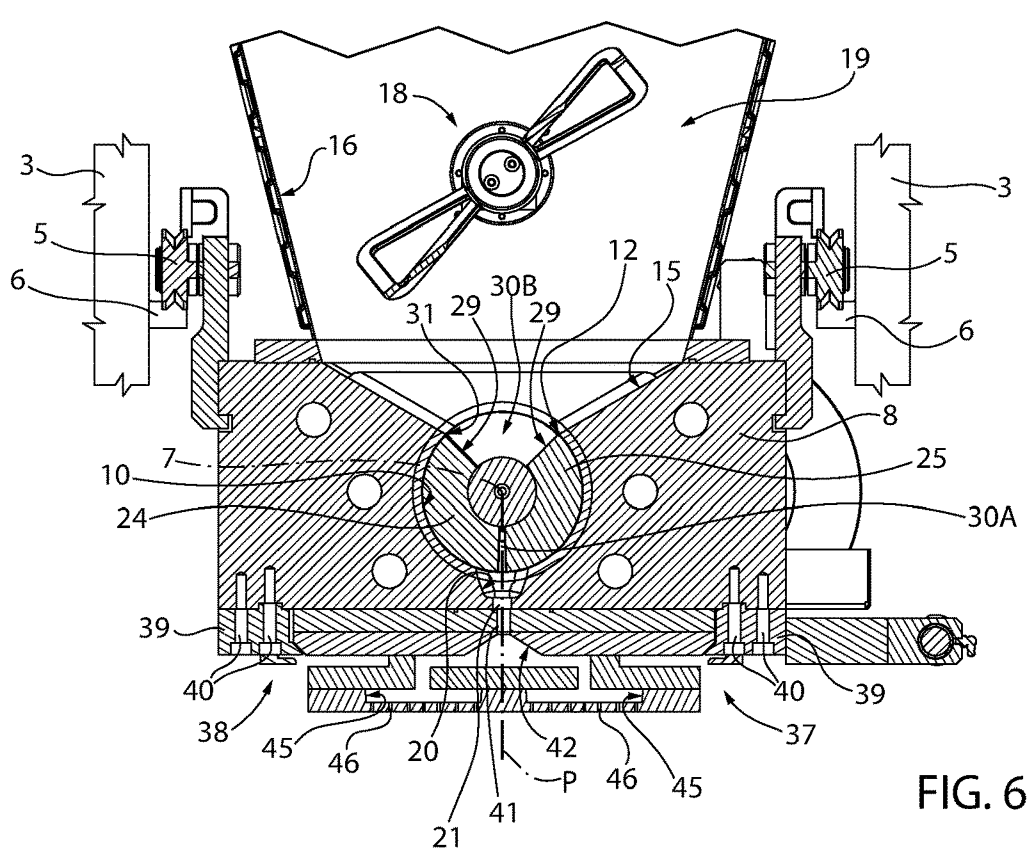

As shown in FIGS. 4 to 6, the pouring plate 37 is independent of the block 8 and is connected to the block 8 by a releasable clamping device, indicated by 38. In the example described, the device 38 comprises a pair of positioning and retaining larding needles 39 tightened against the block 8 by means of screws 40. In this way, the pouring plate 37 can be removed and replaced, extremely quickly and with extreme ease, with a different pouring plate, for example, with each change of fed mixture or following a change of moulds and/or size.

Figure 8:
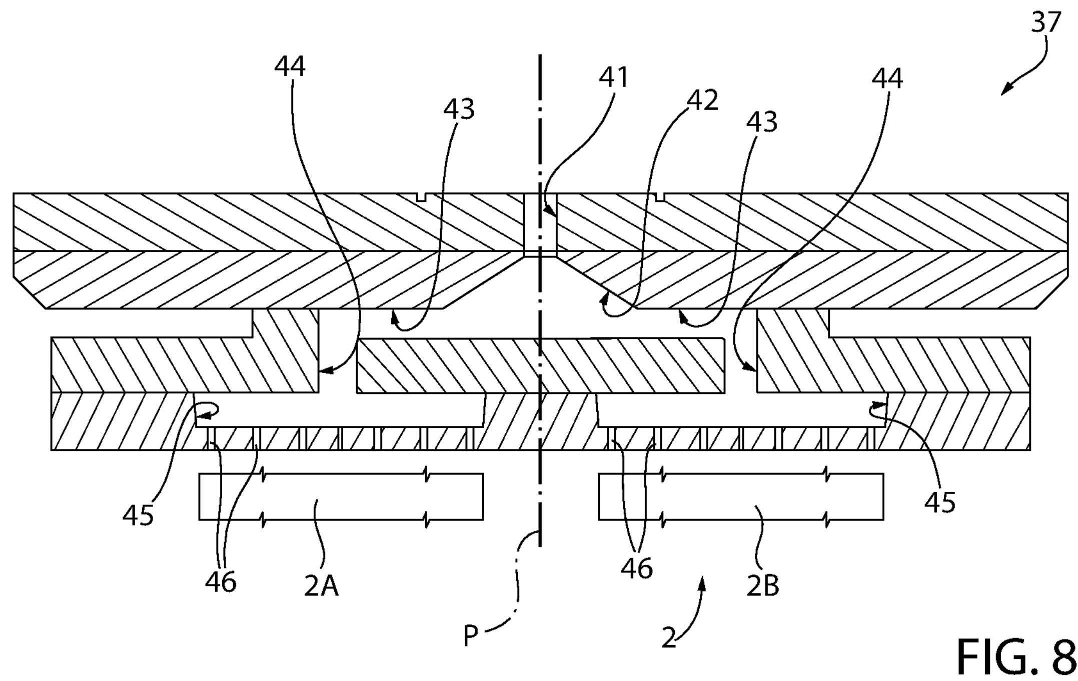
FIG. 8 shows, in cross-section and on an enlarged scale, a detail of FIG. 4.

Again, with reference to FIGS. 4 to 6, and particularly to FIG. 8, the pouring plate 37 extends symmetrically and on opposite sides of the plane P and comprises, for each of the passages 21, a corresponding inlet passage 41 coaxial with the respective passage 21.

Inside the plate 37, each passage 41 leads into a respective storage chamber 42. In the example shown, the chamber 42 has a cross-section orthogonal to the plane P which increases downwards, i.e., in the direction of movement of the mixture. In the example described, the chamber 42 is a flared chamber. Two horizontal ducts or passages 43, which are opposite each other with respect to the plane P and extend along a common axis orthogonal to the plane P, extend from the lower end of the chamber 42. The outlet of each duct 43 communicates with the inlet of a respective vertical duct 44 having an axis parallel to the plane P. Each duct 44 has a respective outlet leading into a respective storage chamber 45, which is separated from the other storage chamber 45, which has a constant cross-section in a direction orthogonal to the plane P.

Each storage chamber 45 is delimited at the bottom by a respective flat wall orthogonal to the plane P, through which a row of calibrated holes or dispensing nozzles 46 is formed, the holes or nozzles being mutually adjacent, so that each can transfer a flow of fluid mixture into a respective compartment of the underlying mould 2A, 2B.

The operation of the machine 1 will now be described starting from the condition shown in FIG. 4, wherein the hoppers 15 and 16 are filled with the fluid mixture to be fed to the moulds 2 and wherein the cavity 30A has its inlet 31 arranged in the hopper 15 and is therefore completely filled and the cavity 30B communicates with the chamber 20. Under these conditions, the two cavities 30A and 30B have the same volume which also corresponds to the volume of fluid mixture that has been previously determined with reference to the characteristics of the moulds 2 mounted on board the machine in order to continuously feed the same moulds.

Starting from this condition, the unit 35 controls the actuator devices 33 and 34 so as to rotate the cavities 30A and 30B by a 180° step, while keeping the volume of the cavities constant. In this way, the cavities 30 exchange positions. When this step is complete, the unit 35 maintains the cavities 30 in angularly fixed positions and rotates the cylindrical sectors 24 and 25 at the same angular speed and in opposite directions around the axis 11, causing the progressive reduction in volume of the cavity 30A and the simultaneous forcing of the fluid mass contained therein, first into the chamber 20 and then into the moulds 2 through the plate 37. Simultaneously with the emptying of the chamber 30A, the chamber 30B opens, reaching a maximum volume when its inlet 31 coincides with the edge of the opening 12, as shown in FIG. 6. Therefore, the cavity 30B fills up completely with a maximum volume of fluid mixture. As soon as the emptying of the chamber 30A has been completed, the unit 35 repeats the previous operation and again rotates the two cavities 30A and 30B by one step, i.e., 180°, while keeping their volume constant, as shown in FIG. 5, until they swap places. At this point, the unit 35 rotates the cylindrical sectors 24 and 25 in opposite directions and at the same angular speed until a volume of fluid mixture equal to the predefined volume has been transferred from the chamber 30B. Once this position has been reached, which is shown in FIG. 4, the unit 35 stops the rotation of the cylindrical sectors 24, 25 and again exchanges the positions of the cavities 30A, 30B, while keeping their volume constant, and the dosing and feeding process resumes following the steps described above.

Conveniently, the stepwise rotation of the cavities 30A and 30B around the axis 7 is carried out by rotating the cavities 30A and 30B in the same direction of rotation, for example clockwise in FIGS. 4 to 6.

Alternatively, according to a different functional mode, the cavities 30A and 30B are still rotated stepwise around the axis 7 but with alternating cyclic motion.

From the above it is clear that the dosing and feeding apparatus 4 described herein, on the one hand allows the fluid mixture to be fed in a continuous and balanced manner to the moulds 2A and 2B, regardless of the direction of rotation of the sectors 24, 25, and on the other hand allows machine downtime, both for production changes and for ordinary cleaning and maintenance operations, to be limited.

The foregoing is partly due to the fact that both cavities 30A and 30B are exchanged in position without changing their volume during this exchange, and that the dosing of the fluid mixture can easily be controlled and varied, as it depends exclusively on the relative position of the two cylindrical sectors 24, 25.

In addition to this, the symmetry of the dosing plate 37 and the presence of the storage chambers 42 and 45, by maintaining a constant feeding, allow the flow of the mixture entering the pouring plate 37 between the two nozzle assemblies 46, therefore between the moulds 2A and 2B, to be distributed mechanically and equally, i.e., in a balanced manner. In other words, the mechanical or construction features of the pouring plate 37 are such that there are two continuous flows of mixture, equal to each other in terms of flow rate and feed speed, flowing out from the pouring plate 37.

Again, with respect to the known solutions, exchanging the cavities 30A, 30B by always rotating them in the same direction of rotation allows the command and control operations to be simplified, and the mechanical stresses, to which the moving components are inevitably subjected, to be reduced.

The absence of concentrated loads leads to an increase in efficiency and durability and a reduction in maintenance times and machine downtime for the replacement of components in relative motion and consumables.

In fact, in the apparatus 4 described herein, all the parts in relative motion are non-deformable parts with large contact or sliding surfaces, so that the specific contact pressures between the moving parts are reduced and, consequently, the wear of the same parts is reduced, even in the presence of high angular speeds.

This leads to low wear and, therefore, minimal maintenance operations and the machine downtime required for maintenance is also, as a consequence, reduced.

Machine downtime is further reduced at each change in production/change of moulds due to the possibility of quickly and easily replacing the entire pouring plate 37 which, at this point, can be removed and replaced with a different pouring plate and treated outside the plant.

The removal of the pouring plate 37 then facilitates the cleaning of the entire block 8, the outlets 21 of which communicate directly with the outside when the plate 37 has been removed.

From the above it is clear that modifications and variations can be made to the apparatus 4 without thereby departing from the scope of protection defined by the independent claims.

In particular, the variable volume cavities 30A, 30B can be obtained in different ways from that indicated by way of example and shaped, for example, according to the fluid mixture to be treated

The invention claimed is:

1. An apparatus for dosing and feeding a fluid or pasty mixture into moulds, in particular a chocolate-based mixture, the apparatus comprising:

an external body fixed against rotation and delimiting a cylindrical dosing and feeding chamber having a longitudinal axis thereof, an inlet opening for said mixture to flow into said cylindrical dosing and feeding chamber, and a single outlet opening for said mixture to flow out of said cylindrical dosing and feeding chamber;

a dosing and feeding device housed in said cylindrical dosing and feeding chamber to receive the mixture from said inlet opening and to feed the mixture through said single outlet opening, said dosing and feeding device comprising two variable volume cavities; and a motorized assembly comprising:

a rotatable cylindrical support core coaxial with said longitudinal axis and elongated along said longitudinal axis;

a pair of cylindrical sectors partially surrounding said core coaxially with said longitudinal axis and connected in a fluid-tight manner to the core, said core and said cylindrical sectors delimiting said two opposing variable volume cavities between them and inside said chamber and arranged to rotate said cavities around said longitudinal axis and to vary their volume, said cavities having respective inlets opposed and diametrically opposite each other with respect to said longitudinal axis, said motorized assembly being configured to rotate said cavities simultaneously and in a stepwise manner around the longitudinal axis between a receiving position for receiving said mixture from said inlet opening and a sending position for transferring said mixture through said single outlet opening, keeping the volume of said cavities constant, and varying the volume of each said cavity while keeping the cavities in angularly fixed positions relative to one another around said longitudinal axis;

a first motorized actuator to rotate said core and said cylindrical sectors in a stepwise manner around said longitudinal axis;

a second motorized actuator to rotate both said cylindrical sectors one with respect to the other at a same angular speed in opposite directions around said longitudinal axis during volume variation of said cavities; and an electronic control and command unit being electrically connected to said first and second motorized actuators and configured to synchronize said first and second motorized actuators with one another.

2. The apparatus according to claim 1, wherein said pair of cylindrical sectors are geometrically and dimensionally equal to one another.

3. The apparatus according to claim 1, wherein said cylindrical dosing and feeding chamber is delimited by a cylindrical surface coaxial to the longitudinal axis and each of the cylindrical sectors is delimited by a respective lateral cylindrical surface slidable in a fluid-tight manner against the cylindrical surface of said dosing and feeding chamber; each said cylindrical sector being, delimited by two flat radial surfaces converging one towards the other and towards said longitudinal axis;

said radial surfaces partially delimiting a respective one of the cavities.

4. The apparatus according to claim 3, wherein said two radial surfaces form between them a dihedral angle of substantially 135°.

5. The apparatus according to claim 1, wherein said core comprises two cylindrical segments aligned with one another along said longitudinal axis; each said cylindrical segment being integrally connected to a respective one of the cylindrical sectors to rotate in unison with the respective one of the cylindrical sectors.

6. A method for dosing a fluid or pasty mixture into moulds, in particular a chocolate-based mixture, by using the apparatus of claim 1, the method comprising the steps of:

feeding the mixture into the inlet opening of the cylindrical dosing and feeding chamber;

dosing and transferring a predefined volume of fluid mixture into the outlet opening by using the two cavities;

rotating the cavities around said longitudinal axis, the cavities being rotated in unison and in a stepwise manner around the longitudinal axis between the inlet opening and the outlet opening while keeping the volume of the two cavities unchanged during said rotation;

filling one of the cavities with a predefined quantity of mixture and simultaneously emptying the other of said cavities by varying the volume of said cavities while keeping the cavities in angularly fixed positions around the longitudinal axis; and simultaneously varying the volume of said respective cavities by rotating both of the two cylindrical sectors parallel to said longitudinal axis around the longitudinal axis at the same angular speed.

7. The method according to claim 6, wherein said cavities are always rotated around said longitudinal axis in the same direction of rotation.

8. The method according to claim 6, wherein said cavities are rotated around the longitudinal axis with alternating cyclic motion.

9. The apparatus according to claim 1, wherein the inlet opening and the outlet opening are diametrically opposite to each other, with respect to the longitudinal axis, and are symmetrical with respect to a vertical central plane on which the longitudinal axis lies.

10. An apparatus for dosing and feeding a fluid or pasty mixture into moulds, in particular a mixture, the apparatus comprising:

an external body delimiting a cylindrical dosing and feeding chamber having a longitudinal axis thereof, an inlet opening for said mixture to flow into said cylindrical dosing and feeding chamber, and a single outlet opening for said mixture to flow out of said cylindrical dosing and feeding chamber; and a dosing and feeding device housed in said cylindrical dosing and feeding chamber to receive the mixture from said inlet opening and to feed the mixture through said single outlet opening, said dosing and feeding device comprising two variable volume cavities; and a motorized assembly comprising:

a rotatable cylindrical support core coaxial with said longitudinal axis and elongated along said longitudinal axis;

a pair of cylindrical sectors partially surrounding said core coaxially with said longitudinal axis and connected in a fluid-tight manner to the core, said core and said cylindrical sectors delimiting said two opposing variable volume cavities between them and inside said chamber and arranged to rotate said cavities around said longitudinal axis and to vary their volume, said cavities having respective inlets opposed and diametrically opposite each other with respect to said longitudinal axis, said motorized assembly being configured to rotate said cavities simultaneously and in a stepwise manner around the longitudinal axis between a receiving position for receiving said mixture from said inlet opening and a sending position for transferring said mixture through said single outlet opening, keeping the volume of said cavities constant, and varying the volume of each said cavity while keeping the cavities in angularly fixed positions relative to one another around said longitudinal axis;

a first motorized actuator to rotate said core and said cylindrical sectors in a stepwise manner around said longitudinal axis;

a second motorized actuator to rotate both said cylindrical sectors one with respect to the other at a same angular speed in opposite directions around said longitudinal axis during volume variation of said cavities; and an electronic control and command unit being electrically connected to said first and second motorized actuators and configured to synchronize said first and second motorized actuators with one another;

a pouring plate separate from said external body located downstream of said single outlet opening, and a releasable connection to removably connect said pouring plate to said external body.

11. The apparatus according to claim 10, wherein said pouring plate comprises an inlet storage chamber communicating with the single outlet opening, outlet storage chambers communicating with the inlet storage chamber, and sets of nozzles, each set of nozzles communicating with a respective one of the storage chambers for dispensing said mixture towards a respective one of the moulds.

12. The apparatus according to claim 10, wherein said pouring plate is symmetrical with respect to a vertical plane of symmetry on which said longitudinal axis lies.

13. An apparatus for dosing and feeding a fluid or pasty mixture into moulds, in particular a chocolate-based mixture, the apparatus comprising:

an external body delimiting a cylindrical dosing and feeding chamber having a longitudinal axis thereof, an inlet opening for said mixture to flow into said cylindrical dosing and feeding chamber, and a single outlet opening for said mixture to flow out of said cylindrical dosing and feeding chamber; and a dosing and feeding device housed in said cylindrical dosing and feeding chamber to receive the mixture from said inlet opening and to feed the mixture through said single outlet opening, said dosing and feeding device comprising two variable volume cavities; and a motorized assembly comprising:

a rotatable cylindrical support core coaxial with said longitudinal axis and elongated along said longitudinal axis;

a pair of cylindrical sectors partially surrounding said core coaxially with said longitudinal axis and connected in a fluid-tight manner to the core, said core and said cylindrical sectors delimiting said two opposing variable volume cavities between them and inside said chamber and arranged to rotate said cavities around said longitudinal axis and to vary their volume, said cavities having respective inlets opposed and diametrically opposite each other with respect to said longitudinal axis, said motorized assembly being configured to rotate said cavities simultaneously and in a stepwise manner around the longitudinal axis between a receiving position for receiving said mixture from said inlet opening and a sending position for transferring said mixture through said single outlet opening, keeping the volume of said cavities constant, and varying the volume of each said cavity while keeping the cavities in angularly fixed positions relative to one another around said longitudinal axis;

a first motorized actuator to rotate said core and said cylindrical sectors in a stepwise manner around said longitudinal axis;

a second motorized actuator to rotate both said cylindrical sectors one with respect to the other at a same angular speed in opposite directions around said longitudinal axis during volume variation of said cavities;

an electronic control and command unit being electrically connected to said first and second motorized actuators and configured to synchronize said first and second motorized actuators with one another; and one collar coupled in a fluid-tight manner to said core for each cylindrical sector, each said cylindrical sector stably carrying, connected at one end thereof, said respective collar and having an opposite end arranged in abutment against the collar of the other cylindrical sector.

* * * * *